Oct. 31, 1967 W. D. CRATER 3,350,039
CLUTCHING MEANS FOR LAUNCHING AND ARRESTING
AIRCRAFT AND THE LIKE
Filed Oct. 18, 1965 3 Sheets-Sheet 1
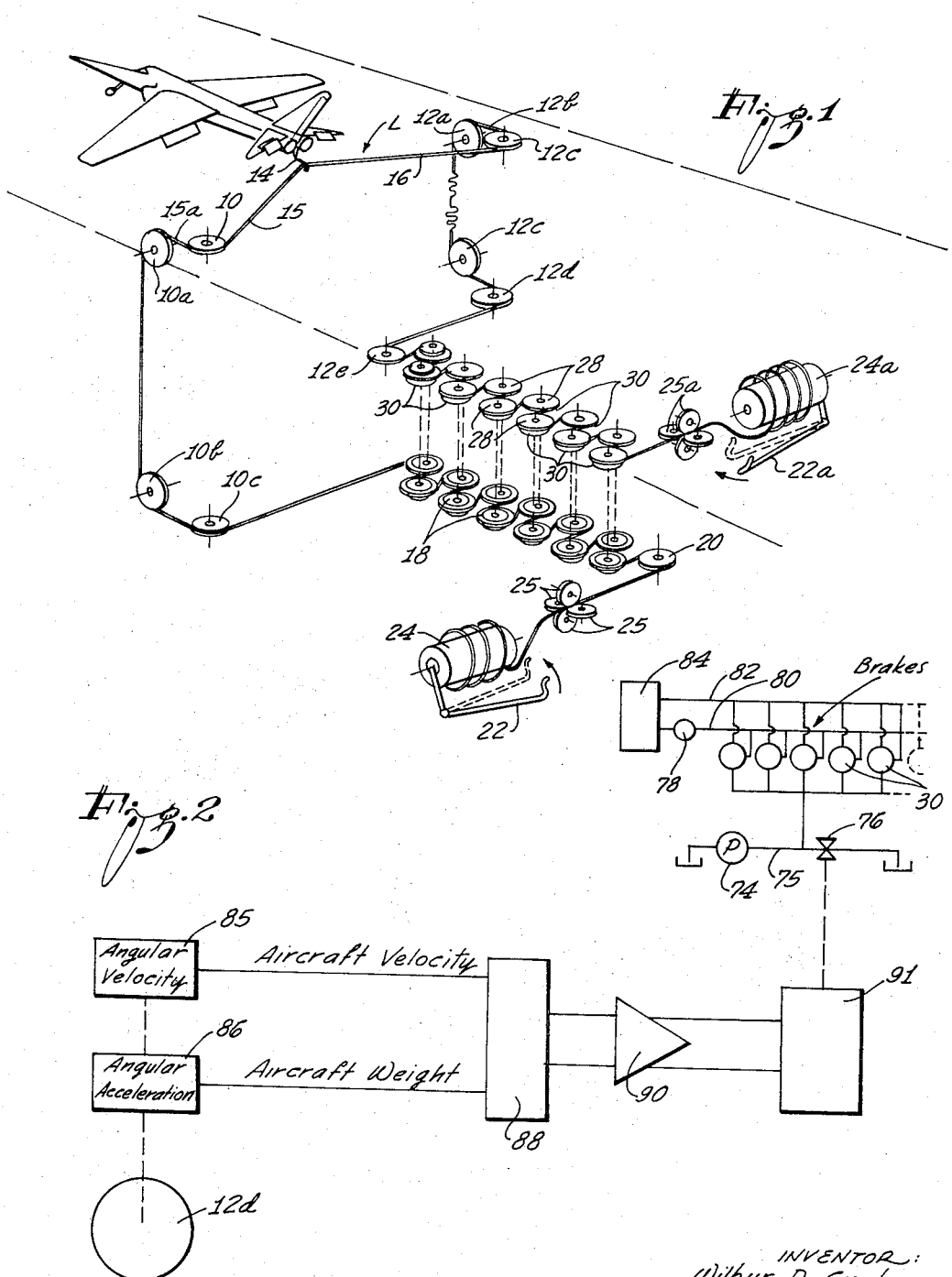
INVENTOR:
Wilbur D. Crater
Attorneys

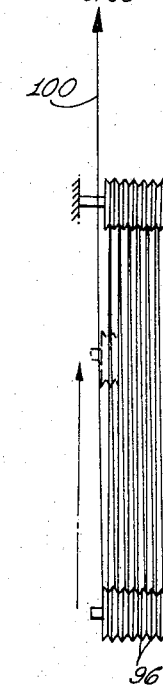
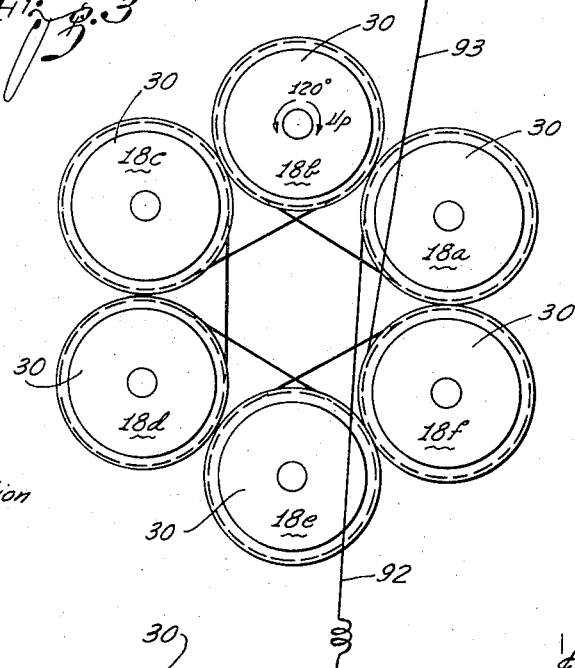
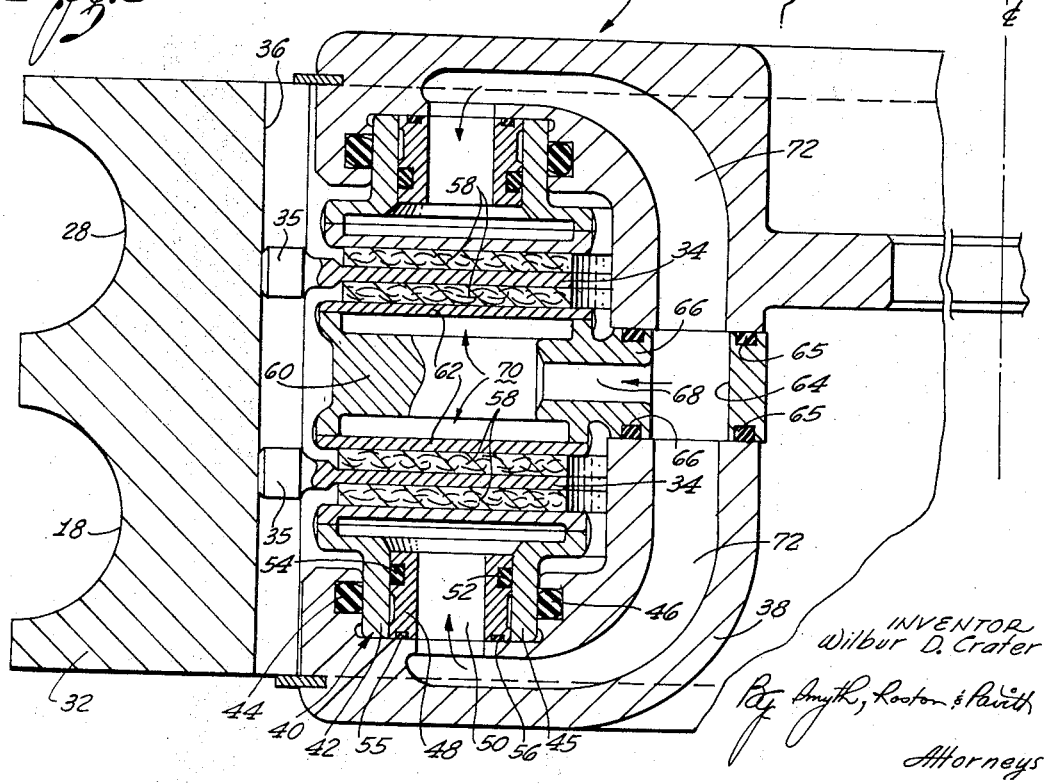

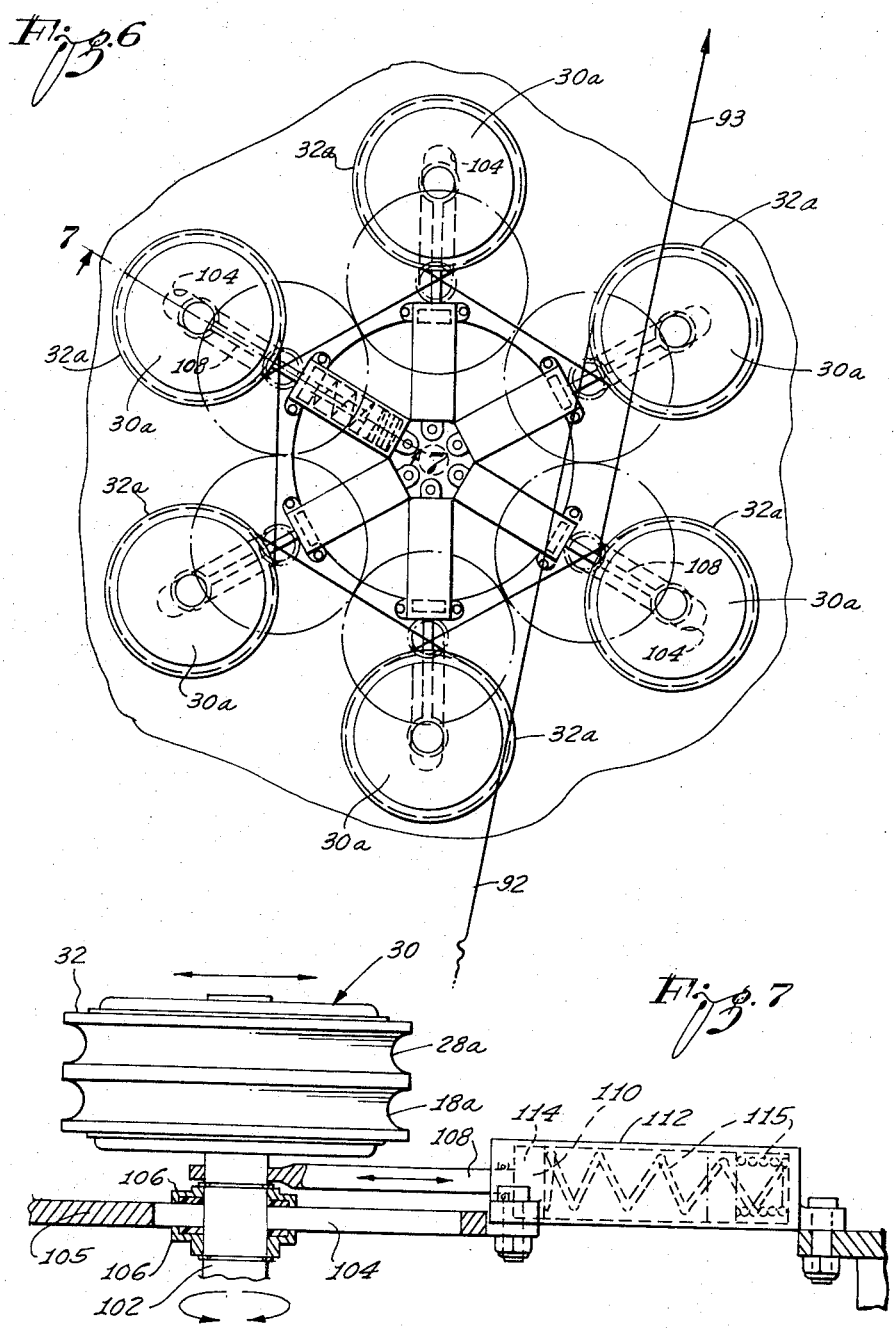

United States Patent Office 3,350,039
Patented Oct. 31, 1967

3,350,039
CLUTCHING MEANS FOR LAUNCHING AND ARRESTING AIRCRAFT AND THE LIKE
Wilbur D. Crater, 1867 Mandeville Canyon Road, Los Angeles, Calif. 90049
Filed Oct. 18, 1965, Ser. No. 497,239
21 Claims. (Cl. 244—110)

ABSTRACT OF THE DISCLOSURE

In a system for arresting a landing aircraft, a series of sheaves is provided with individual brakes and a cable for engagement by the aircraft is looped around the sheaves in series in frictional engagement therewith for a smooth clutch operation which involves initial slippage of the cable relative to the sheaves in sequence. Cable is fed to the series of sheaves from a cable storage means without involving inertial resistance by the mass of stored cable.

---

This invention relates to an operation of quickly changing the relative movement between a mass and a separate structure by means of a cable acting between the mass and a mechanism on the structure and, more particularly, the invention relates to a clutching means for engaging the cable with the mechanism to bring about a smooth rapid transition from an initial state of disparity between the rate of operation of the mechanism and the velocity of the mass relative to the structure, to a second desired state of correspondence between the two. For example, to launch an aircraft from a structure such as a ship, the disparity at the initial state is that the aircraft is stationary relative to the ship while the launching mechanism on the ship is operating at a high rate and the desired smooth rapid transition by clutch action is to a state in which the launching mechanism operating at a rate corresponding to the velocity of the aircaft is accelerating the aircraft relative to the ship without significant slippage of the cable. On the other hand, to arrest an aircraft landing on a structure such as a ship, the disparity at the initial state is that the aircraft is moving at high velocity relative to the ship while the mechanism is idle and the desired smooth transition by clutch action is to a state in which the mechanism is decelerating the aircraft and is operating at a rate corresponding to the velocity of the aircraft without significant slippage of the cable. Thus in the first instance the energy-controlling mechanism transmits energy to the aircraft by means of the cable and in the second instance the energy-controlling mechanism absorbs energy from the aircraft by means of the cable.

Smoothness in addition to rapidity in the response to the initial abrupt application of force to the cable is vital to avoid a hazardous rise in tension of the cable above the initial magnitude of tension created by the force. This hazard may be understood when it is considered that if an arrested cable is suddenly attached to a high velocity mass in an unyielding manner, the longitudinal wave along the cable created by the initial impact doubles the load on the cable when and if the wave reflects from the arresting mechanism in the brief period of time in which the cable is straining to equalize the velocity of the cable and the speed of operation of the mechanism and, theoretically, if the wave is reflected back along the cable towards the mass in that same period of time the cable tension may rise abruptly to three times the original dynamic tension when the reflected wave reaches the aircraft hook.

In the broadest aspect, the invention has utility for various purposes other than launching or arresting an aircraft. For example, the invention may serve to decelerate freight dropped from an aircraft or may serve to decelerate launching gear immediately after the launching gear is disengaged from a launched aircraft. Other uses may relate to rendezvous of space aircraft. For the purpose of illustration, the invention is described herein as applied to the arresting of an aircraft on the deck of a ship, such a disclosure providing adequate guidance for those skilled in the art who may have occasion to apply the same principles to other specific purposes.

One difficulty to be met in the rapid arrestment of aircraft is the inertia involved in the acceleration of the energy-absorbing apparatus. For example, if the cable is wound on a reel and energy is absorbed from the reel, both the inertia of the mass of the reel itself and the inertia of the mass of the cable stored on the reel must be overcome in the clutching operation.

Another difficulty arises in any arrangement in which the cable is wound helically around a rotary member of the energy-absorbing mechanism. The cable tends to climb the rotary member axially and if the tendency is counteracted by shaping the rotary member like a ship's capstan, the turns of the cable may be crowded together with damaging results under the high load imposed by the speeding aircraft.

These difficulties are met by a number of provisions which work together for the purpose of the invention. One provision is to store the idle cable separate from the energy absorbing apparatus in such manner that the cable is picked up from storage as needed instead of the mass of stored cable being accelerated as a whole. Another provision is to divide the energy-absorbing mechanism or apparatus into a plurality of relatively small rotary units, the total mass of which is exceedingly small in comparison to the mass of a single unit of the same energy-absorbing capability. With respect to the clutching operation, an advantage of even more importance in employing a plurality of relatively small energy-absorbing units is found in the sequential operation of the units with initial slippage of the cable at each unit and initial stretching of the cable between units with progressive reduction in tension of the cable by stages to substantially zero tension where the cable is withdrawn from storage.

A third provision is the spatial arrangement of the relatively small rotary units to cause the cable to travel through the apparatus in substantially a plane. The result is the elimination of the difficulties created by helical routing of the cable.

In an aircraft arresting system, the cable is formed into a loop for engagement by the aircraft and energy is absorbed from both legs of the cable loop. In the present invention two arrays of brake-retarded sheaves are employed for the two legs respectively of the cable loop and the sheaves of the two arrays are paired for continuous equalization of the travel of the two legs. In a preferred practice of the invention disclosed herein, each energy-absorbing unit comprises two coaxial sheaves and an associated brake, the two legs of the cable loop being wrapped around the two sheaves respectively.

Another advantage of the invention is that a series of brake-equipped sheaves may be arranged in a compact array for an installation where space is at a premium as on an aircraft carrier. Another advantage is that such an energy-absorbing system is highly economical because sheaves are relatively inexpensive and because commercially available brakes may be employed with the sheaves. A further advantage is that the selected brakes may be liquid cooled for sustained efficiency and for high capacity for energy dissipation. A still further advantage is that the retardation force exerted by the series of brakes is subject to precise instantaneous adjustment over a wide range of values.

Additional inherent advantages of utmost importance are found by test and analysis. One of the inherent advantages of the system is that the distributed low inertia, which is clutched up to cable speed one sheave at a time, minimizes reflections of the longitudinal waves. Another inherent advantage is that the low overall inertia reduces the acceleration time that is required to minimize peak tension caused by reflection of the transverse waves from the laterally spaced points where the two legs of the cable loop contact the first guide pulleys of the system. Still another inherent advantage is that since the low inertia of the system reduces the duration of the initial dynamic transients, a correspondingly greater portion of the runout distance is available for the application of a constant braking force.

The preferred practice of the invention is further characterized by the inclusion of means to sense the initial velocity and initial acceleration of the cable for the purpose of deducing both the velocity and the weight of the aircraft for instantaneous computation and application of the optimum magnitude of braking force to decelerate any given aircraft over the full length of the runout distance. Other features of the invention relates to the selection of suitable means to store the cable that is paid out by the operation of the series of energy-absorbing units.

The features and advantages of the invention may be understood from the following detailed description and the accompanying drawings.

In the drawings, which are to be regarded as merely illustrative:

FIG. 1 is a schematic perspective view of the presently preferred embodiment of the invention;

FIG. 2 is a diagram of the control system for setting the magnitude of the braking force in accord with the weight and velocity of the aircraft;

FIG. 3 is a diagrammatic plan view showing an alternate generic arrangement for the array energy-absorbing unit;

FIG. 4 is a somewhat diagrammatic elevational view of means for storing the cable that issues from an array of the energy-absorbing unit;

FIG. 5 is a somewhat diagrammatic radial sectional view of a pair of unitary sheaves and an associated hydraulic brake for applying retarding force to the sheaves;

FIG. 6 is a plan view of another embodiment of the invention in which the rotary members of a circular array of rotary members are mounted for bodily shift in response to tensioning of the cable, the bodily shift and the individual rotary member being employed to absorb energy; and FIG. 7 is a fragmentary sectional view taken as indicated by the line 7—7 of FIG. 6.

FIG. 1 shows a portion of a cable extending between two opposite guide sheaves 10 and 12 to form a loop, generally designated L, for engagement by an aircraft that is to be arrested or decelerated, for example engagement by a hook 14 to bring the aircraft to a complete stop within a given runout distance which may, for example, be approximately 200 feet long.

The cable loop L which is normally retracted to a straight line between the two guide sheaves 10 and 12 may be regarded as comprising a left leg 15 and a right leg 16. The cable portion 15a which is continuous with the loop leg 15 passes around the guide sheave 10 and three additional guide sheaves 10a, 10b and 10c that route the cable to one end of a series of sheaves 18 that are arranged in an array of two staggered rows. The cable is wrapped around the sheaves 18 circumferentially with the cable engaging something less than the full circumference of each sheave.

The cable continues from the left array of sheaves 18 around a guide sheave 20 to suitable means to store the portion of the cable that is not in actual use. In this particular embodiment of the invention, a storage mechanism is employed which functions in the well known manner of a spinning reel employed by fishermen. The cable is level wound by a winding arm 22 onto a spool or drum 24. After the cable is wound on the drum in multiple layers, the winding arm 22 is retracted so that the cable can spin freely off the drum 24 with the drum stationary, the cable running through two sets of guide sheaves 25 arranged in opposing pairs.

Minimum inertia is involved in the paying out of the cable from storage because the drum 24 and the stored cable are stationary. Only the length of cable between the aircraft hook 14 and the drum 24 moves during the recovery of an aircraft. The drive for the rewind arm 22 may be a hydraulic motor fed on high pressure oil from an accumulator, the accumulator being charged during the previous landing by a sheave driven pump.

The right leg 16 of the cable loop is routed in the same manner as the left leg. Thus the cable 16a that is a continuation of the right leg 16 is guided by five guide sheaves 12a, 12b, 12c, 12d and 12e to a second plurality of sheaves 28 arranged in a second similar array of two staggered rows. The cable issuing from the array of sheaves 28 is wound by a level arm 22a onto a spool or drum 24a and when the cable is paid out of storage it is guided by two pairs of opposed guide sheaves 25a.

As indicated diagrammatically in FIG. 1, the sheaves 18 and 28 of the two arrays are paired, with each pair positioned and interconnected coaxially, and with each pair operatively connected to a corresponding brake 30. Thus there is a plurality of brakes 30 corresponding to the pluralities of sheaves 18 and 28 with the plurality of brakes arranged in a similar array of two staggered rows.

In this particular practice of the invention each of the brakes 30 is a liquid cooled brake manufactured by The B. F. Goodrich Co., the brake being of the type designated 2–709. The general structure of an energy-absorbing unit comprising a pair of sheaves and associated brake may be understood by referring to FIG. 5. In FIG. 5 the pair of sheaves 18 and 28 are parts of a single sheave structure 32 which is journalled by suitable bearings (not shown). The brake is of the disk type and the braking force is applied to a pair of aluminum disks or flat rings 34 which are inside the radius of the sheave structure 32. Since the aluminum disks 34 must rotate with the sheave structure and yet be free for axial movement, the two aluminum disks have integral key portions 35 which are slidingly mounted in key ways 36 of the inner circumference of the sheave structure.

The brake proper comprises an annular brake housing 38 which is suitably anchored in stationary position. Two annular brake shoes 40 which function as pistons are carried by the brake housing 38 to act against the two aluminum disks 34 respectively, each shoe being on the outer side of the corresponding aluminum disk so that the two shoes urge the two aluminum disks toward each other. Each of the two annular brake shoes 40 has an outer circumferential wall 42 which is embraced by an O-ring 44 and has an inner circumferential wall 45 which embraces an O-ring 46.

The two circumferential walls 42 and 45 of each brake shoe straddle a corresponding stationary ring 48 that is formed with a plurality of radial bores 50. The stationary ring 48 carries an O-ring 52 in sealing contact with the inner circumferential wall 45, an outer O-ring 54 in contact with the outer circumferential wall 42 and two O-rings 55 and 56 in contact with the brake housing 38. Each of the aluminum disks 34 has a non-metallic lining 58 on each of its two opposite faces.

Interposed between the two aluminum disks 34 is a stationary ring-shaped central structure 60 which includes two copper walls 62 for braking cooperation with the inner sides of the two aluminum disks 34. The ring-shaped central structure 60 has a transverse bore 64 and is sealed by a pair of O-rings 65 which are positioned radially inward from the bore and a second pair of O-rings 66 which are positioned radially outward of the bore. The central ring structure 60 is formed with radial bores 68 which respectively place the transverse bores 64 in communication with inner spaces 70 contiguous to the copper walls 62.

The braking force is applied to the braking shoes 40 by means of a hydraulic fluid such as a suitable grade of oil which acts solely on the ends of the outer and inner circumferential walls 42 and 45 respectively of the brake shoes. Suitable cooling fluid such as a water-glycol solution is circulated through the brake structure. For this purpose the brake housing 38 is formed with a pair of passages 72 on opposite sides of the central structure 60. It may be seen in FIG. 6 that the cooling liquid may flow into the interior of the two annular brake shoes 40 and may flow into the interior of the central structure 60. The cooling fluid enters the passages 72 through an inlet port (not shown) and leaves the brake housing through an outlet port (not shown) positioned 180° from the inlet port, the outlet port being in communication with a pair of passages which are similar to the pair of passages 72. It is contemplated that the cooling fluid will be continuously circulated through the brake structure and through a heat exchanger, the heat-dissipating capacity of the system being sufficient to absorb the kinetic energy of the landing aircraft at the programed landing rates.

FIG. 2 shows diagrammatically how the hydraulic fluid for actuating the brakes 30 may be supplied and controlled. A pump 74 draws the hydraulic fluid from a suitable reservoir and delivers the fluid to a pipe 75 which leads back to the reservoir and which is provided with a variable orifice 76. On the upstream side of the orifice 76 the pipe 75 is connected to the various brakes 30. Cooling water for the various brakes is supplied by a pump 78 to a supply manifold 80 and the heated water is received by a return manifold 82. The return manifold 82 is connected to a suitable heat exchanger 84 and the heat exchanger is in turn connected to the pump 78.

It is apparent that the retarding force applied by the brakes 30 to the various sheaves 18 and 28 will depend upon the degree which the variable orifice 76 restricts the fluid flow through the pipe 75. It is contemplated that each brake will have an adjustable relief valve which may be regulated to keep the associated sheave from skidding.

FIG. 2 further shows diagrammatically how the retarding force applied by the brakes may be governed automatically in accord with the velocity and weight of an aircraft that is being arrested. The control system requires that the travel of the cable be sensed and for this purpose a first sensor 85 may be operatively connected to the previously mentioned guide sheave 12a to sense the angular velocity of the guide pulley and a second sensor 86 may be connected to the same guide pulley to detect the angular acceleration of the guide pulley.

When the aircraft makes initial impact against the loop L of the cable the effect on the rotation of the guide pulley 12a is picked up by the two sensors 85 and 86 which send corresponding signals to a computer 88. The computer 88 deduces the velocity of the newly contacted aircraft from the signal from the sensor 85, deduces the weight of the aircraft from the signal from the sensor 86 and from these two factors computes the lowest magnitude of braking force that may be used to decelerate the aircraft within the available runout distance. The computed signal is delivered to a power amplifier 90 which actuates a mechanism 91 which is adapted to regulate the size of the variable orifice 76.

The manner in which the described system operates to arrest an aircraft may be understood from the foregoing description. With the apparatus ready and a maximum amount of cable stored on the two drums 24 and 24a, an aircraft to be arrested makes impact aaginst the cable loop L in the manner shown in FIG. 1. As the aircraft elongates the loop L the two legs 15 and 16 of the cable are drawn through the two arrays of sheaves 25 and 28 and the aircraft is decelerated by the retarding force that is applied to the sheaves 18 and 28 by the hydraulic brakes 30.

During this period of arresting the aircraft, the cable moves freely from storage on the two drums 24 and 24a with minimum resistance by inertia. The initial effect of the aircraft on the cable loop L is measured by the two sensors 85 and 86 which adjust the retarding force created by the brakes 30 to bring the aircraft to a dead stop at approximately the end of the available runout space. After the aircraft is brought to a stop, the cable loop L is disengaged from the aircraft and the rewind arms 22 and 22a are actuated to store cable at the ends of the two cable legs and thus return the cable loop to its initial configuration in readiness for arresting the next aircraft.

As heretofore stated the cable slips slightly at each of the successive energy-absorbing units to result in a smooth response to the impact of a high velocity aircraft. After the initial impact this slightly slipping ceases and the cable and sheaves run at the same velocity because of the friction between the cable and the sheaves. The tension of the cable drops from sheave to sheave throughout each of the arrays of sheaves during the operation of arresting an aircraft.

FIG. 3 shows how one of the two legs of the cable loop L may be sequentially engaged by a series of energy-absorbing units that are arranged in a circular array. Each of the energy-absorbing units has an uppermost sheave 28 and is of the previously described construction. In FIG. 3 a length of cable 92 drawn from storage is wrapped around the six sheaves in the following order: sheave 18a, sheave 18b, sheave 18c, sheave 18d, sheave 18e and sheave 18f. From sheave 18f the cable extends to the aircraft in the direction indicated at 93. The second leg of the cable may engage the same sheaves in FIG. 6 but in a different order.

FIG. 4 shows an alternate means for storing a quantity of cable. In the arrangement shown in FIG. 4, an upper set of coaxial sheaves 94 is mounted on a shaft 97 that may be raised and lowered. The dead end of the cable is anchored as indicated at 98 and the cable is wound around the two sets of sheaves as shown with the cable making wrapping contact with the two sets of sheaves alternately. Finally, as indicated at 100, the cable is directed to a corresponding array of energy-absorption units. When the maximum amount of cable is in storage with the second set of sheaves 96 in the lower position indicated in solid lines, the lower set of sheaves is elevated to the ready position indicated in dotted lines, the elevation of the lower set of sheaves leaving the cable in the form of a series of loose loops.

It is apparent that as the cable is withdrawn from storage, the loose loops are tightened sequentially with the consequence that the cable is accelerated only as it is needed, it not being necessary to accelerate the whole mass of stored cable at once.

In the array of sheave structures shown in FIG. 1 and again in the array of sheave structures shown in FIG. 3, it is apparent that each sheave structure is urged in a particular radial direction by the load on the cables that are looped around the sheave structures. A further feature of the invention is the concept of making the individual sheave structures movable in these radial directions and providing energy-absorbing means to oppose such radial movement. FIG. 6, for example, shows a circular array of brake-equipped sheave structures embodying this concept.

The circular array shown in FIG. 6 is largely identical to the array shown in FIG. 3 as indicated by the use of corresponding numerals to indicate corresponding parts. As shown in FIG. 7, each sheave structure 32a which is equipped with a corresponding brake 30a incorporates a lower sheave 18a and an upper sheave 28a. Each of the sheave structures 32 is rotatably mounted on a corresponding shaft 102 which is slidable in the particular radial direction in which the sheave tends to move in response to cable loading. There are, of course, two legs of cable engaging the upper and lower sheaves respectively of the sheave structures. One leg of cable enters the array in the direction indicated at 92 and extends from the array to the aircraft in the direction indicated at 93. The other leg of cable enters the array at a different sheave and of course leaves the array by a different sheave. It is apparent that the loads on the two cables urge each of the sheave structures inwardly of the array on a radius of the sheave structure that is a radius of the circular array. In the construction shown, each of the shafts 102 is slidable along a slot 104 in a base plate 105, the six slots being aligned with the center of the circular array. Suitable means is provided to resist tilting of the shaft 102 which means may include a pair of collars 106 in sliding abutment with the opposite faces of the base plate 105.

Each of the shafts 102 may be connected to energy absorbing means in the form of a suitable dashpot. In the construction shown each shaft 102 is connected to a piston rod 108 that carries a dashpot piston 110 in a dashpot cylinder 112, the cylinder containing a suitable fluid such as oil and the piston being provided with a restricted passage 114 to urge the corresponding sheave structure 32a towards its normal radially outward position.

When the two cables associated with the array of sheave structures 32a are placed under heavy load in the course of arresting an aircraft, the sheave structures behave in the previously described manner and in addition react to the cable loads by shifting inwardly along the corresponding slots 104 in opposition to the resistance afforded by the described dashpots. Thus the arrangement shown in FIG. 6 provides a yielding action which is in addition to the various yielding actions in the function of the array that have been described heretofore. After the whole array has been radially contracted in this manner and the cable loads have been removed, the array expands back to its original state by virtue of the pressures exerted by the compression springs 15.

My description in specific detail will suggest various changes, substitutions and other departures from my disclosure within the spirit and scope of the appended claims.

I claim:
1. In a system of the general character described in which a flexible elongated member in the form of a cable or the like is engaged by a mass for transfer of energy by the cable between the mass and an energy-controlling mechanism, the improvement for clutch action between the cable and the mechanism, comprising:
   said mechanism having a series of rotary members with energy-controlling means operatively connected to individual rotary members of the series thereto;
   said cable being wrapped around the rotary members in sequence for engaging the rotary members solely by friction for friction clutch action in sequence among the rotary members with initial slippage of the cable at the rotary members in sequence, with stretching of the cable and with changes in tension of the cable progressively by stages through the sequence for smooth rapid transition from a state of disparity between the velocity of the mass and the speed of operation of the mechanism to a state of correspondence between the two; and
   the inclusion of cable storage means to feed cable to the series of rotary members without involving the inertial resistance by the mass of stored cable.

2. An improvement as set forth in claim 1 in which the cable is looped around each rotary member with the loop extending around less than 360° but more than 260° of the rotary member.

3. An improvement as set forth in claim 1 in which the rotary members rotate close to a single plane with the travel of the cable through the series close to the plane.

4. An improvement as set forth in claim 1 in which the rotary members are arranged in two closely spaced staggered rows.

5. An improvement as set forth in claim 1 in which the rotary members are arranged in a circular array.

6. In a system of the general character described, the combination of:
   a support structure;
   a mechanism mounted on the support structure and comprising a series of rotary members;
   a cable for engagement by a mass moving at high speed relative to the support structure to arrest the mass relative to the support structure,
   said cable engaging said rotary members solely by friction to accelerate the rotary members to a speed of rotation commensurate with the speed of the mass, said cable being formed in loops around the rotary members in sequence to frictionally drive the rotary members sequentially with initial slippage of the cable and initial stretching of the cable sequentially through the series of rotary members and with reduction in tension of the cable by stages through the series of rotary members;
   energy-absorbing means operatively connected directly to said rotary members to decelerate the accelerated rotary members to arrest the mass; and
   cable storage means to feed cable to the series of rotary members without involving the inertial resistance by the mass of stored cable.

7. A combination as set forth in claim 6 in which said energy-absorbing means comprises brake means.

8. A combination as set forth in claim 7 in which said brake means is water cooled.

9. A combination as set forth in claim 6,
   in which the tension in at least one of said loops tends to move the corresponding rotary member laterally;
   in which said rotary member is movable laterally in response to said tendency; and
   which includes energy-absorbing means to yieldingly oppose the lateral movement of the rotary means.

10. In a system of the general character described, the combination of:
    a support structure
    a mechanism mounted on the support structure and comprising a series of rotary members;
    a cable for engagement by a mass moving at high speed relative to the support structure to arrest the mass relative to the support structure,
    said cable engaging said rotary members solely by friction to accelerate the rotary members to a speed of rotation commensurate with the speed of the mass, said cable being wrapped around the rotary members in sequence to operate the rotary members sequentially with initial slippage of the cable and initial stretching of the cable sequentially through the series of rotary members and with progressive reduction in tension of the cable by stages through the series of rotary members;
    energy-absorbing means operatively connected to said rotary members to decelerate the accelerated rotary members to arrest the mass; and
    means to store an idle portion of the cable and to feed the stored cable to the mechanism with acceleration of only the portion of the stored cable that is being fed to the mechanism.

11. A combination as set forth in claim 10 in which the means to store the cable comprises a spinning reel arrangement wherein the cable is wound on a drum to store the cable and the cable is subsequently dispensed by peeling away from the drum while the drum is stationary.

12. A combination as set forth in claim 10 in which said means to store the idle portion of the cable stores the idle portion of a series of loose loops for sequential feeding of the loops to the mechanism.

13. In a system for absorbing kinetic energy from a moving body, the combination of:
   a plurality of sheaves;
   brake means directly connected to the sheaves to oppose rotation of the sheaves;
   a cable adapted for connection with the moving body, said cable being wrapped around the sheaves sequentially to operate the sheaves sequentially with initial slippage of the cable at each sheave and reduction in tension of the cable by stages through the series of sheaves; and
   means responsive to changes in the rate of travel of the cable to adjust the magnitude of retarding force applied by the brake means.

14. A combination as set forth in claim 13 in which said responsive means senses both the velocity of the cable and acceleration of the cable and adjusts the magnitude of the applied brake force accordingly.

15. In a system for transmitting energy to a structure from a mass, the combination of:
   a loop of a cable adapted for engagement with the mass,
   a first plurality of sheaves;
   a second corresponding plurality of sheaves paired with the sheaves of the first plurality and connected directly thereto for synchronous rotation therewith; and
   energy-controlling means operatively connected to the sheaves,
   one leg of the loop of cable being wrapped around said first plurality of sheaves in sequence,
   the other leg of the loop of the cable being wrapped around the second plurality of sheaves in sequence.

16. A system as set forth in claim 15 in which the two sheaves of each pair of sheaves are unitary and coaxial.

17. A system as set forth in claim 16 in which the energy-controlling means comprises a corresponding plurality of brakes operatively connected to the respective pairs of the sheaves.

18. A system as set forth in claim 15 in which the sheaves of each of the pluralities of sheaves are arranged in two closely spaced staggered rows.

19. A system as set forth in claim 15 in which the sheaves of each of the two pluralities of sheaves are arranged in a circular array.

20. A combination as set forth in claim 15 which includes two separate cable storage means corresponding to the two pluralities of sheaves respectively, each of said cable storage means feeding cable to the corresponding plurality of sheaves without involving inertial resistance by the mass of stored cable.

21. In a system for absorbing kinetic energy from a moving mass wherein a cable is engaged by the moving mass and energy-absorbing means engages the cable, means to store the cable that issues from the energy-absorbing means, said storage means comprising:
   a spinning reel arrangement wherein the cable is wound on a drum to store the cable and the cable is subsequently dispensed by peeling away from the outside winding of the drum while the drum is stationary; and
   means rotatable about the axis of the drum to rewind the cable on the drum for storage of the cable.

References Cited

UNITED STATES PATENTS

| | | | |
|---|---|---|---|
| 2,762,586 | 9/1956 | Van Zelm | 244—110 |
| 2,971,727 | 2/1961 | Haber | 244—110 |
| 2,979,163 | 4/1961 | Van Zelm et al. | 244—110 |
| 3,081,842 | 3/1963 | Zindler et al. | 188—72 |
| 3,092,210 | 6/1963 | Ronnerstrom | 188—1 |
| 3,220,216 | 11/1965 | Byrne et al. | 244—110 |

FOREIGN PATENTS

| | | |
|---|---|---|
| 1,154,819 | 11/1957 | France. |
| 642,705 | 9/1950 | Great Britain. |

MILTON BUCHLER, *Primary Examiner.*

P. E. SAUBERER, *Assistant Examiner.*